Oct. 14, 1941.  T. L. ROBINSON  2,259,324
METHOD OF MANUFACTURING ROLLER BEARINGS
Filed Dec. 23, 1939  2 Sheets-Sheet 1

INVENTOR
Thomas L. Robinson
BY Everett H. Wright
ATTORNEY

Oct. 14, 1941.  T. L. ROBINSON  2,259,324
METHOD OF MANUFACTURING ROLLER BEARINGS
Filed Dec. 23, 1939  2 Sheets-Sheet 2

INVENTOR
Thomas L. Robinson
BY
ATTORNEY

Patented Oct. 14, 1941

2,259,324

UNITED STATES PATENT OFFICE 2,259,324

METHOD OF MANUFACTURING ROLLER BEARINGS

Thomas L. Robinson, Grosse Pointe, Mich.

Application December 23, 1939, Serial No. 310,684

4 Claims. (Cl. 29—148.4)

This invention relates to roller bearings of the cylindrical roller or needle type.

When roller bearings of the prior art bind or tend to bind from misalignment or inaccuracy of manufacture friction is developed between the rollers and the inner race member and/or between the rollers and the outer race member. The raceways of the inner and outer race members are generally hardened during manufacture to such a degree that, when binding develops from misalignment and inaccuracy of manufacture, long periods of operation are required to wear the bearing to normal operating freeness.

In high-speed installations or service, the wearing-in of roller bearings often causes overheating of the bearings which expands the various elements thereof to such a degree that either freezing occurs or irreparable damage is done to the raceways or rollers thereof.

Portions of the hardened annular edges of the inner and outer race members often chip or spall off near the ends of the rollers due to extremely heavy concentrated loads applied to the race members at and near the ends of the rollers. Chipping or spalling of the race members is more apt to occur in roller bearings which are assembled without sufficient clearances between the rollers and the race members particularly when such roller bearings are run under heavy loads with the outer and inner race members in misalignment caused by shaft and pillow block misalignment or by bearing support deflection under conditions of heavy loading.

With the foregoing in view the primary object of the invention is to provide an improved cylindrical roller or needle-type roller bearing which will accommodate itself to reasonable inaccuracies in manufacture and/or misalignment in installation with relatively short wearing-in periods and without the hazard of the annular edges of the inner and outer race members chipping and spalling off under abnormal stresses to which the race members of roller bearings are subjected when running under conditions of slight inaccuracies of manufacture and assembly and misalignment in their installation.

Another object of the invention is to provide a roller bearing having zone hardened inner and outer race members which are relatively softer at the sides of the raceways than at the center thereof which permit plastic deformation of the race members into convex surfaced raceways during the "wearing-in" period of the bearing whereby to reduce friction and the area of contact between the race members and the rollers to a minimum.

Another object of the invention is to provide a roller bearing having the center of the raceways of the inner and outer race members relatively harder than the outer sides of the said raceways whereby to permit the bearing to wear its roller paths slightly convex without chipping or spalling off of the raceways near the outer annular edges thereof and without damage to the rollers thereof.

Another object of the invention is to provide a novel and inexpensive method of producing or manufacturing roller bearings having slightly convex raceways.

Another object of the invention is to provide a novel roller bearing and method of manufacturing the same which imparts to the roller bearing ability to wear itself without damage into free running condition in cases where there has been a misalignment of the race members or where there has been inaccuracy in the manufacture of the component parts thereof.

Another object of the invention is to provide a zone hardened roller bearing and method of manufacturing the same which may be economically and accurately assembled with the retainer rings thereof firmly secured with respect to the outer race member.

Other objects of the invention will become apparent by reference to the following detailed description taken in connection with the accompanying drawings, in which.

Figures 1, 2:
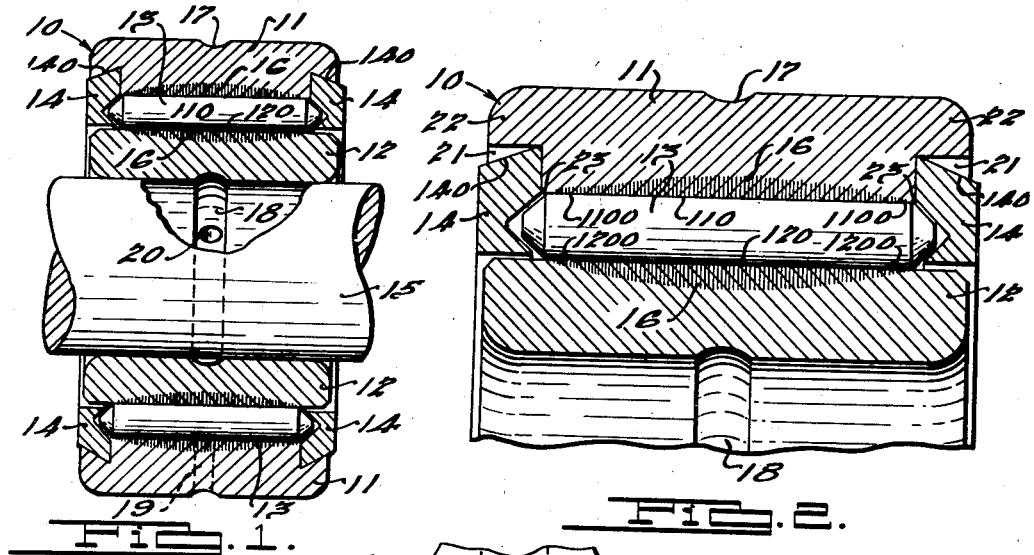
Fig. 1 is a cross sectional view of a roller bearing embodying the invention having a shaft mounted through the inner race member thereof.
Fig. 2 is an enlarged fragmentary cross sectional view of the roller bearing disclosed in Fig. 1 completely assembled but without the retainer rings firmly secured to the ends of the outer race member.

Referring now to the drawings wherein like numerals refer to like and corresponding parts throughout the several views, and with particular reference to Figs. 1 and 2, the roller bearing generally designated by the numeral 10 is composed of an outer race member 11, an inner race member 12, and a plurality of rollers 13 disposed between said race members 11 and 12, the said rollers 13 being retained in operating relationship with respect to the raceway 110 of the outer race member 11 by means of retainer rings 14. The bearing 10 is indicated in Fig. 1 with a shaft 15 fitted within the inner race member 12. The raceway 110 of the outer race member 11 and the raceway 120 of the inner race member 12 are zone hardened at 16 preferably as diagrammatically indicated by shading disposed normal to the raceways 110 and 120 throughout the drawings.

The outer and inner race members 11 and 12 are preferably provided with oil grooves 17 and 18 respectively and each race member is provided with an oil bore 19 and 20 respectively communicating between the said oil grooves 17 and 18 and the raceways 110 and 120. The outer race member 11 is provided with counterbores 21 at the side thereof to accommodate the retainer rings 14 which have an outer sloping periphery 140.

After the zone hardening the raceway 110 of the outer race member 11, the rollers 13 are assembled therein and a retainer ring 14 is placed in the counterbores 21 at each side of the said race member 11. The outer annular rim 22 of each side of the outer race member 11 is then peened, pressed or rolled over the sloping periphery 140 of the retainer rings 14 whereby to hold the retainer rings 14 and the rollers 13 in the desired assembled relationship with respect to the outer race member 11. After the outer race member 11 is completely assembled as hereinbefore described, the inner race member 12 is telescoped therewithin; the raceway 120 of the inner race member 12 having been zone hardened at 16 similar to the zone hardening of the raceway 110 of the outer race member 11.

Zone hardening of the outer and inner race members 11 and 12 is preferably accomplished electrically by the induction method as diagrammatically indicated by the shading 16 throughout the drawings; the deeper the shading 16 the harder and deeper the hardening of the said race members. By reference to Figs. 2, 3 and 6, it will be noted that the sides of the raceway 110 at 1100 and the sides of the raceway 120 at 1200 are left relatively softer than the central portion of the raceways 110 and 120, and that the annular corners 23 are left practically unhardened, all of which contribute to accomplish the beneficial results herein set forth. The zone hardening of the raceway 120 of the inner race member 12 is accomplished in a like and similar manner and with a fixture set-up similar to but reversed with respect to the one disclosed in Fig. 3 for the hardening of the raceway 110 of the outer race member 11.

Figure 3:
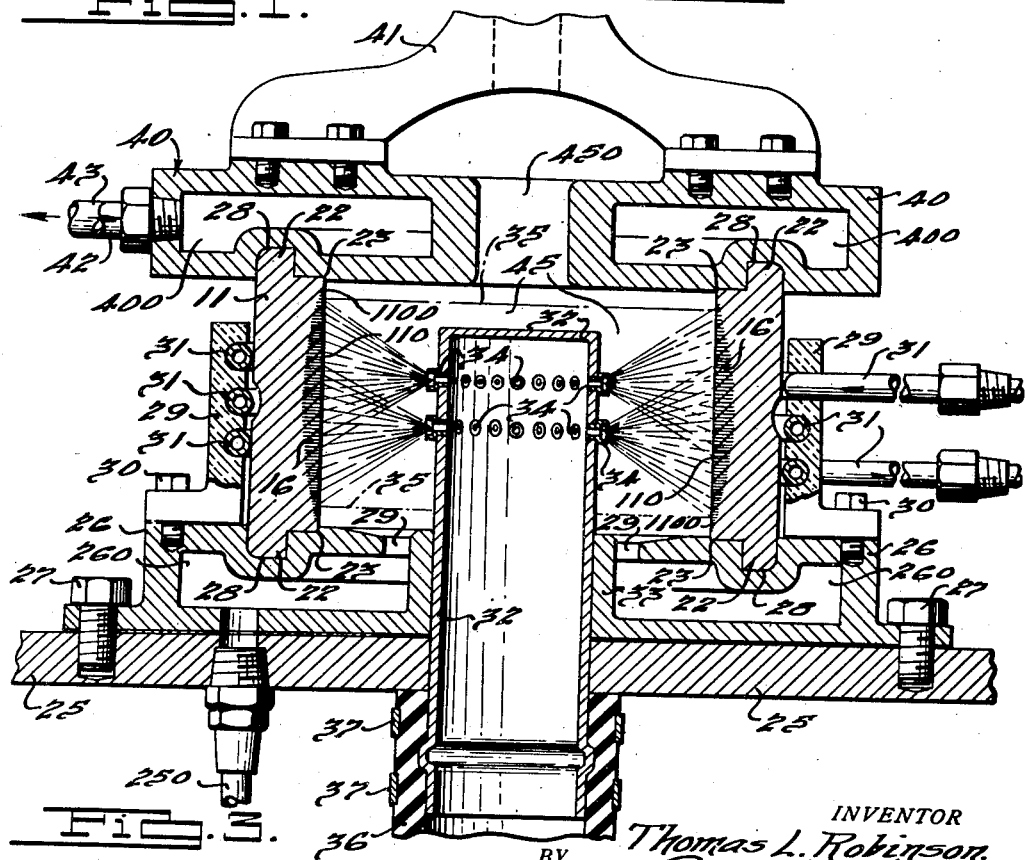
Fig. 3 is an enlarged cross sectional view showing a preferred method of zone hardening the outer race member of a roller bearing embodying the invention.

In Fig. 3, the work table 25 of an induction zone hardening machine preferably employed has a zone hardening fixture 26 secured thereto by the studs 27, the said fixture 26 being formed with an annular chase 28 therein which receives and shields the lower outer rim 22 and preferably the lower annular corner 23 of the raceway 110 of the race member or work piece 11 as viewed in Fig. 3. The said fixture 26 has a plurality of insulating brackets 29 secured thereto by means of studs 30 which accommodate and support several turns of water cooled conductor 31 connected to a source of high frequency induction current employed to bring the work piece up to the desired heat prior to quenching.

A quenching jet 32 extends through the work table 25 and collar 33 of the fixture 26 as indicated in Fig. 3. The jet 32 is provided with a plurality of suitable spray nozzles 34 therearound which throw coolant supplied under pressure through the jet 32 to the surface of the raceway 110 of the race member 11 being hardened. The spray nozzles 34 may be changed to spray nozzles of different size and aperture to give the desired direct coverage of the raceway 110 by the coolant employed, as for example in Fig. 3, the direct coverage of the coolant is indicated to be between the dot and dash lines 35. A suitable hose 36 clamped to the jet 32 by such means as the hose clamps 37 is preferably connected to a suitable source of coolant timed to supply water or other coolant to the work piece 11 after it has been heated to the desired temperature.

To prevent distortion of the work piece 11 during heat treating, an upper fixture 40 is employed which is carried by a bracket 41 adapted to be raised and lowered by the operator of a zone hardening machine of which the bracket 41 on the table 25 is a part. The said upper fixture 41 is preferably formed with an annular chase 28 therein which telescopes or fits over the upper outer rim 22 and preferably the upper annular corner 23 of the raceway 110 of the race member or work piece 11 as viewed in Fig. 3.

The upper fixture 40 is preferably provided with a suitably baffled coolant chamber 400 through which coolant is circuated from coolant supply and return lines 42 and 43. The lower fixture 26 is preferably provided with a sump chamber 260 having drain ports 29 in the top thereof to receive quenching coolant from the chamber 45 formed by the work piece 11, the lower fixture 28 and the upper fixture 40. A suction line 250 from a suitable source of suction is connected to the work table 25 and communicates with the sump chamber 260 as indicated in Fig. 3 for withdrawing spent coolant from the sump chamber 260. Sufficient coolant is supplied through the jet 32 during each cycle of operation of the zone hardening equipment to maintain the lower fixture 26 suitably cooled. The said upper fixture 40 is preferably provided with a central aperture 450 through which steam from the quenching of a work piece escapes.

Inasmuch as no claim is made to the induction zone hardening machine of which the table 25 and the bracket 41 is a part, only sufficient of the machine is disclosed in Fig. 3 to illustrate the particular method of zone hardening the raceway 110 of the outer race member 11 of a roller bearing 10 to produce the novel bearing herein disclosed and method of manufacturing the same.

To accomplish the desired zone hardening in the preferred manner, the outer race member 11 is positioned centrally within a high frequency induction coil 31 substantially as disclosed in Fig. 3 and, as hereinbefore described, is held from distortion during heat treating by suitable fixtures 26 and 40 and is shielded against hardening at its annular corners 23 and annular rims 22 by the said fixtures which are suitably cooled. While so positioned and shielded, the said race member 11 is subjected to a high frequency magnetic field set-up by passing high frequency current through the said coil 31 for sufficient time to heat the raceway portion 110 to be hardened up to hardening temperature after which the race member is quenched by quenching fluid forced out of the jets 34. The application of the high frequency current followed by the quenching is preferably automatically or electrically timed to produce hardness of the raceway 110 substantially to the degree illustrated by the diagram 16 throughout the drawings wherein the center of the raceway 110 is relatively harder than the sides 1100 thereof, the annular corners 23 remaining substantially unhardened. The inner race member 120 is hardened in a like and similar manner.

It is preferable that the rollers 13 of roller bearings embodying the invention and manufactured in accordance with the method herein disclosed be hardened slightly harder than or at least to the hardness of the central portion of the raceways 110 and 120.

Figure 4:
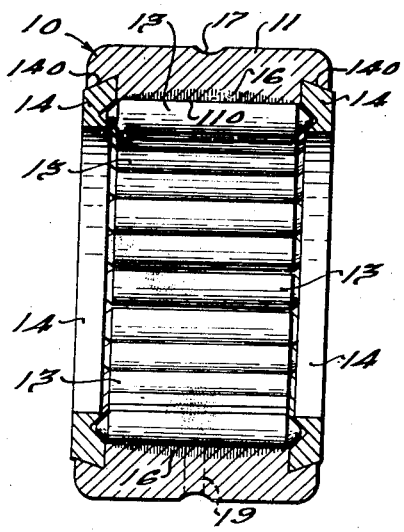
Fig. 4 is a cross sectional view of the roller bearing disclosed in Fig. 1 with the inner race member and shaft removed.
Figure 5:
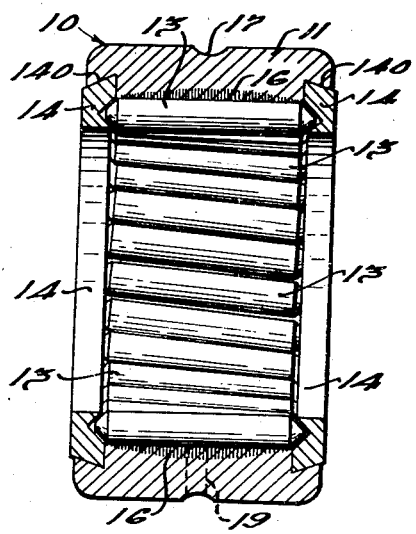
Fig. 5 is a cross sectional view similar to Fig. 4 except that the rollers are shown in a skewed position which the said rollers take during the "wearing-in" of a roller bearing when the roller bearing itself is inaccurately manufactured or when operated under conditions of misalignment of the race members thereof with respect to each other.
Figure 6:
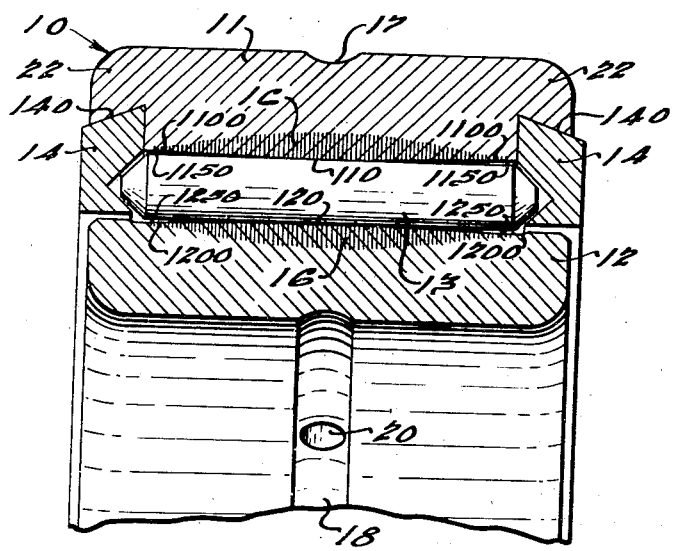
Fig. 6 is an enlarged fragmentary view of the bearing disclosed in Figs. 4 and 5 showing the convex roller paths developed after an initial "wearing-in" period of an inaccurately manufactured bearing or one operating under conditions of misalignment of the race members thereof with respect to each other.

When a bearing 10 has its raceways 110 and 120 of its race members 11 and 12 hardened as hereinbefore described and the said bearing 10, which is designed to run with its roller in alignment as indicated in Fig. 4, is caused to run with its rollers on a skew as disclosed in Fig. 5 by misalignment in installation of the bearing or by inaccuracy of manufacture, the raceways 110 and 120 tend to bind and excessive pressure is developed against the raceways 110 and 120 near the sides thereof. Inasmuch as the sides 1100 and 1200 of the raceways 110 and 120 respectively are relatively soft, the bearing 10 readily "wears-in" at 1150 and 1250 which causes the raceways 110 and 120 to assume a convex cross section as best shown in Fig. 6. Thus the usual destructive "wearing-in" period is avoided by employing the invention.

Also, because of the fact that the annular corners 23 of the bearing 10 are not hardened to any particular degree, the frequent failure of a bearing, which begins by the corners 23 of the outer raceway 12 spalling or chipping off under heavy loads or when operating under conditions of misalignment, is generally avoided.

The assembly of bearings is simplified by the instant invention inasmuch as the outer annular rims 22 of the outer race member 11 remain soft and ductile after the raceway 110 of the outer race member 11 is hardened and are capable of being rolled, peened or pressed over the sloping periphery 140 of the retainer rings 14.

A bearing 10 hardened as herein described and with relatively softer sides to its raceways than the center thereof readily forms itself during "wearing-in" into a bearing having convex raceways which, although known to be extremely desirable, was not heretofore economically possible in roller bearings manufactured in large production for sale in highly competitive markets.

Therefore, the novel bearing herein disclosed and novel method of manufacturing the same provides a bearing which has superior "wearing-in" qualities which will not spall or chip under heavy loading or which operating under conditions of misalignment, which will shape itself during use into a bearing having desirable convex raceways, and which can be readily and economically manufactured.

Rather than let the bearings wear in after being placed in service, it is contemplated as a part of the method of manufacturing the same herein disclosed that the bearings, after zone hardening and assembly, may be run on suitable jigs or running-in blocks at the factory with the raceways slightly out of alignment. Thus, a highly desirable bearing having convex surfaced raceways could be manufactured at a slight expense over the normal cost of producing like roller bearings having parallel raceways and at a fraction of the expense of machining or grinding the raceways to a convex surface.

Although but a single embodiment of the invention has been disclosed and described in detail, it is to be understood that many changes in the size, shape, arrangement and detail of the various parts thereof may be made and that the novel methods employed to accomplish the desired results may be altered, all without departing from the spirit of the invention, and it is not intended to limit the scope of the invention other than by the terms of the appended claims.

I claim:

1. The method of producing free running roller bearings of the class described comprising the steps of hardening the raceways of the race members thereof harder at the center of the said raceways than at the sides thereof, hardening the rollers to at least the hardness of the center of the raceways, assembling the bearing, and then placing the said bearing in service wherein the raceways thereof will convex through plastic deformation and free the bearing when binding occurs through slight inaccuracy of manufacture or operating under a condition of misalignment of the raceways thereof.

2. The method of manufacturing roller bearings of the class described comprising the machining of the inner and outer race members to the desired size, counterboring the outer race member at the ends thereof leaving annular outer rims at the said ends thereof, hardening the said inner and outer race members only at the raceway thereof harder at the center of the said raceways than at the sides thereof and leaving the said annular outer rims of the outer raceway unhardened, hardening the rollers of the said roller bearing to at least the hardness of the center of the said raceways, assembling the outer race member and rollers of said bearing with a retainer ring having a sloping outer periphery placed in each counterbore having the greatest periphery thereof disposed at the base of said counterbore, forming the said unhardened annular outer rims of said outer race member over said retainer rings whereby to hold the retainer rings and rollers guided thereby in operating relationship with respect to the outer race member, telescoping the said inner race member within the said assembled outer race member, and then running the said bearing under a condition of misalignment of the raceways thereof whereby to convex said raceways by plastic deformation thereof.

3. The method of manufacturing roller bearings of the class described comprising the steps of hardening the raceways of the race members thereof, annealing the sides of the said raceways relatively softer than the center thereof, hardening the rollers to at least the hardness of the center of the raceway, assembling the bearing, and then wearing the raceways into a convex surface by running the assembled bearing with the raceways thereof out of alignment with respect to each other.

4. The method of producing free running roller bearings of the class described comprising the steps of hardening the raceways of the race members thereof, annealing the said raceways at the sides thereof leaving a relatively harder path at the center than at the sides of said raceways, hardening the rollers to at least the hardness of the center of the raceways, assembling the bearing, and then placing the said bearing in service wherein the raceways thereof will convex through plastic deformation and free the bearing when binding occurs through slight inaccuracy of manufacture or operating under a condition of misalignment of the raceways thereof.

THOMAS L. ROBINSON.